United States Patent [19]

Rice et al.

[11] Patent Number: 4,912,921
[45] Date of Patent: Apr. 3, 1990

[54] LOW SPEED SPOOL EMERGENCY POWER EXTRACTION SYSTEM

[75] Inventors: John N. Rice; Jarvis J. M. Yeh, both of Rockford, Ill.

[73] Assignee: Sundstrand Corporation, Rockford, Ill.

[21] Appl. No.: 167,715

[22] Filed: Mar. 14, 1988

[51] Int. Cl.⁴ .................................................. F02C 3/10
[52] U.S. Cl. ............................... 60/39.04; 60/39.091; 60/39.163; 244/58
[58] Field of Search ............... 60/39.03, 39.04, 39.163, 60/39.161, 39.142, 39.091; 244/58

[56] References Cited

U.S. PATENT DOCUMENTS

| | | |
|---|---|---|
| 2,873,576 | 2/1959 | Lombard . |
| 2,952,973 | 9/1960 | Hall et al. . |
| 2,977,071 | 3/1961 | Plotkowiak et al. .................. 244/58 |
| 3,228,475 | 1/1966 | Worthmann . |
| 3,469,398 | 9/1969 | Schafer . |
| 3,662,975 | 5/1972 | Driskill ................................. 244/58 |
| 3,722,217 | 3/1978 | Reynolds et al. . |
| 3,800,534 | 4/1974 | Kacek . |
| 3,834,161 | 9/1974 | Quigley, Jr. et al. . |
| 3,940,926 | 3/1976 | Craig ..................................... 60/269 |
| 4,033,115 | 7/1977 | Baits . |
| 4,062,185 | 1/1977 | Snow .................................. 60/39.163 |
| 4,104,876 | 8/1978 | Larsen et al. . |
| 4,454,754 | 6/1984 | Zagranski ............................ 73/117.3 |
| 4,684,081 | 8/1987 | Cronin .................................... 244/58 |
| 4,776,163 | 10/1988 | Brockmann ........................ 60/39.161 |

FOREIGN PATENT DOCUMENTS

| | | |
|---|---|---|
| 2443213 | 3/1976 | Fed. Rep. of Germany ........ 244/58 |
| 3533720 | 4/1987 | Fed. Rep. of Germany ........ 244/58 |

*Primary Examiner*—Donald E. Stout
*Attorney, Agent, or Firm*—Antonelli, Terry & Wands

[57] ABSTRACT

An emergency on board power source (28) for jet aircraft having high (22) and low speed (14) spools is disclosed for operation above altitudes where auxiliary power units (14) are operational. A power takeoff (56) is provided from the low speed spool of the jet engine to drive an emergency power unit (28) for supplying electrical and/or hydraulic on board power to the aircraft to maintain control during emergency conditions during which the auxiliary power unit is not operational or is not operational to supply sufficient power to maintain hydraulic or elecrical on board power to uninterruptible electrical and hydraulic power loads.

25 Claims, 7 Drawing Sheets

LOW SPEED SPOOL EMERGENCY POWER EXTRACTION SYSTEM

TECHNICAL FIELD

The present invention relates to emergency power units for use in providing uninterruptible electric and hydraulic power for gas turbine powered aircraft having high and low speed spools.

BACKGROUND ART

It is well known that jet aircraft which perform at high altitudes are subject to flameout at which altitude it is not possible to obtain emergency on board electrical and hydraulic power from auxiliary power units (APUs) until the aircraft has descended to a lower altitude at which the air breathing APU may be started. APUs are used for providing power to start a jet aircraft on the ground and further to provide on board power in the air when the jet engine has flamed out. Existing emergency power units (EPUs) are provided in jet aircraft to provide emergency on board power for altitudes above the altitude at which the APU will operate. U.S. Pat. Nos. 3,722,217, 3,800,534 and 4,033,115 disclose systems for providing emergency hydraulic power. These EPUs use stored chemical energy systems which have fuels such as hydrazine for providing emergency on board power. As is known a jet aircraft has propulsive power supplied by the jet engine(s) to maintain flight velocity and on board power which is electrical and hydraulic power for controlling the control surfaces and electrical loads of the aircraft Unfortunately, these chemical based EPUs impose costs and handling penalties as a result of the toxicity characteristics of the chemical energy system fuels.

Currently, and in the future, aircraft which are designed to operate at high altitudes require uninterruptible on board electrical and hydraulic power over their entire altitude flight envelope The aforementioned chemical based EPUs represent a substantial cost and handling penalty in aircraft which are to achieve high performance. Accordingly, a need exists for an EPU having minimal cost and performance penalties for use in transient high altitude emergency power situations wherein flameout can occur at an altitude where APUs are not operational.

FIG. 1 illustrates a typical supersonic aircraft flight envelope As illustrated therein, above 40,000 ft., the APU is not operational to provide any power for supplying emergency on board hydraulic or electrical power. In this region, the aforementioned EPUs such as those involving hydrazine or other chemical energy storage systems have been utilized prior to the present invention. In the region between 30,000 and 40,000 ft., the APU is operational with a reduced output which is insufficient to satisfy the necessary on board hydraulic and electrical requirements necessary to maintain control of the aircraft when a flameout occurs. As illustrated, below 30,000 ft., the APU is operational to supply the totality of electrical and hydraulic on board power necessary to maintain control of the aircraft during flameout and to restart the aircraft Conventional two spool turbofan jet engines have a power takeoff from the high speed spool. Power has been extracted from the low speed spool for running oil lubrication pumps. The high speed spool is mechanically connected to an airframe mounted accessory drive which provides both electrical and hydraulic on board power for the airframe. However, the prior art to date does not utilize a power takeoff from the low speed spool during high altitude loss of propulsive power to generate hydraulic and electrical on board power to control the airframe until it has descended to an altitude low enough to permit the engines of the aircraft to be restarted or for on board power to be provided by the APU.

U.S. Pat. No. 2,952,973 discloses the generation of auxiliary power to operate a fuel pump, hydraulic fluid pump and an alternator during high speed operation and to operate the aforementioned fuel pump, hydraulic pump and alternator by the low pressure turbine at low aircraft speeds. However, the '973 patent does not teach the generation of emergency power by the aircraft during flameout or other emergency engine operation conditions U.S. Pat. No. 3,662,975 teaches the generation of emergency power from an auxiliary compressed gas source even in the event of loss of power of all jet engines by compressed gas applied to the power generating turbine.

U.S. Pat. No. 3,834,161 teaches the generation of auxiliary power from a free power turbine. However, the '161 patent does not teach the generation of emergency power from a power takeoff connected to the low speed spool of a jet engine

SUMMARY OF THE INVENTION

The present invention provides an emergency on board power source for jet aircraft having at least one gas turbine with each gas turbine having a low speed spool and a high speed spool by providing a power takeoff during the emergency condition from the low speed spool. During an emergency situation such as flameout, the rotational inertia of the low speed spool and its operation as a windmill provide power sufficient for generating on board electrical, hydraulic or electrical and hydraulic power of a magnitude sufficient to maintain control of the aircraft until the aircraft has dropped to an altitude at which an air breathing APU may be operated to generate on board power until the aircraft jet engines may be restarted. Moreover, the present invention provides an assist for the APU in the altitude range described above with reference to the prior art at which the APU is not capable of generating sufficient on board power to maintain control of the aircraft during an emergency condition such as flameout.

The present invention has the advantage over the prior art chemical energy storage EPUs of not requiring high cost and high weight components which degrade aircraft performance.

An emergency power source for a jet aircraft having at least one or gas turbine each having a low speed spool and a high speed spool for providing emergency on board power to the aircraft when the aircraft is at an altitude which prevents sufficient auxiliary power from being generated by an APU to supply an emergency on board power requirement of the aircraft includes a power takeoff coupled to the low speed spool for outputting rotary power from the low speed spool; an emergency power generating unit for generating power when the emergency power generator is driven by rotary power from the power takeoff; and a coupling unit for selectively coupling the power takeoff to the emergency power generating unit. Furthermore, the invention includes a power loss sensor for sensing a loss of propulsive power from the one or more turbines and causing the coupling unit to couple the power takeoff to the emergency power generating unit in response to the sensing of the loss of propulsive power. The APU and the emergency power generating unit are each coupled to power generators which supply on board power to the aircraft. The APU is a gas turbine which does not delivery any power when the aircraft is at or above a maximum altitude at which power may be generated; and the coupling unit couples the power takeoff to the emergency power generating unit continuously from a time of loss propulsive power when the aircraft is above the maximum altitude to a time when the aircraft drops below the maximum altitude at which the APU may deliver on board power to the aircraft. The emergency power generating unit delivers electrical and hydraulic power to the aircraft.

In a first embodiment of the invention, the emergency power generating unit includes a gear box coupled to the coupling unit; a first hydraulic pump driven by the gear box for producing pressurized hydraulic fluid; a hydraulic motor, coupled to the hydraulic pump for producing rotary power; and an emergency power generator driven by the hydraulic motor. The emergency power generator includes a second hydraulic pump for producing pressurized hydraulic fluid; and an electrical power generating system for generating electrical power. The first embodiment includes a hydraulic accumulator coupled to the first and second hydraulic pumps for accumulating pressurized hydraulic fluid; a hydraulically powered starting motor, coupled to the hydraulic accumulator, for providing rotary output power; and a load compressor driven by the hydraulically powered starting motor and the auxiliary powered unit. The emergency power generating unit and the APU are each coupled to the electrical power generating system and the second hydraulic pump for independently applying driving power thereto.

A second embodiment of the invention includes a gear box coupled to the coupling unit; a first hydraulic pump driven by the gear box for producing pressurized hydraulic fluid; a hydraulic motor, coupled to the hydraulic pump for producing rotary power; an emergency power generating unit driven by the hydraulic motor with the emergency power generating unit including a second hydraulic pump for producing pressurized hydraulic fluid and an electrical power generating system for generating electrical power; a pressurized air start system coupled to a source of pressurized air; a start motor, coupled to the pressurized air start system for providing rotary power in response to pressurized air from the pressurized air start system; and a load compressor, driven by the APU for providing pressurized air in response to rotary power applied from the APU. The EPU and the APU are each coupled to the electrical power generating system and the second hydraulic pump for independently applying driving power thereto; and the load compressor is coupled to the source of pressurized air.

A third embodiment of the invention includes a gear box coupled to the coupling unit; a hydraulic pump driven by the gear box for producing pressurized hydraulic fluid; a hydraulic motor, coupled to the hydraulic pump, for producing rotary power; and a first electric power generating system, coupled to the hydraulic motor, for producing electrical power in response to rotary power from the hydraulic motor. The third embodiment further includes a gear box, coupled to the APU for providing rotary power in response to rotary power from the APU; a load compressor, coupled to the gear box, for providing pressurized air in response to rotary power from the gear box; a hydraulic pump, coupled to the gear box, for providing pressurized hydraulic fluid in response to the rotary power from the gear box; a second electrical power generating system having an electrical start, coupled to the gear box and to the first electrical power generating system for providing electrical power in response to rotary power from the gear box and for applying rotary power from the electrical starter to the gear box in response to electrical power from the first electrical power generating system.

The fourth embodiment of the invention includes a gear box coupled to the coupling unit for providing rotary power in response to rotary power from the coupling unit; a hydraulic pump driven by the gear box for producing pressurized hydraulic fluid; and an electrical power generating system, coupled to the gear box, for producing electrical power in response to rotary power from the gear box. The fourth embodiment of the invention further includes a pressurized air start system coupled to a source of pressurized air; a start motor, coupled to the pressurized air start system, for providing rotary power in response to pressurized air from the pressurized air start system; and a load compressor, driven by the APU for providing pressurized air in response to rotary power applied from either or both the start motor and the APU. The EPU and the APU are each coupled to the electrical power generating system and the hydraulic pump for independently applying driving power thereto via mechanically coupled cross-shafts.

The fifth embodiment of the invention includes a gear box, coupled to the coupling unit, for providing rotary power in response to rotary power from the coupling unit; a hydraulic pump, coupled to the gear box for providing pressurized hydraulic fluid in response to rotary power from the gear box; and an electrical power generating system coupled to the gear box, for providing electrical power in response to rotary power from the gear box.

BEST MODE FOR CARRYING OUT THE INVENTION

Figure 1:
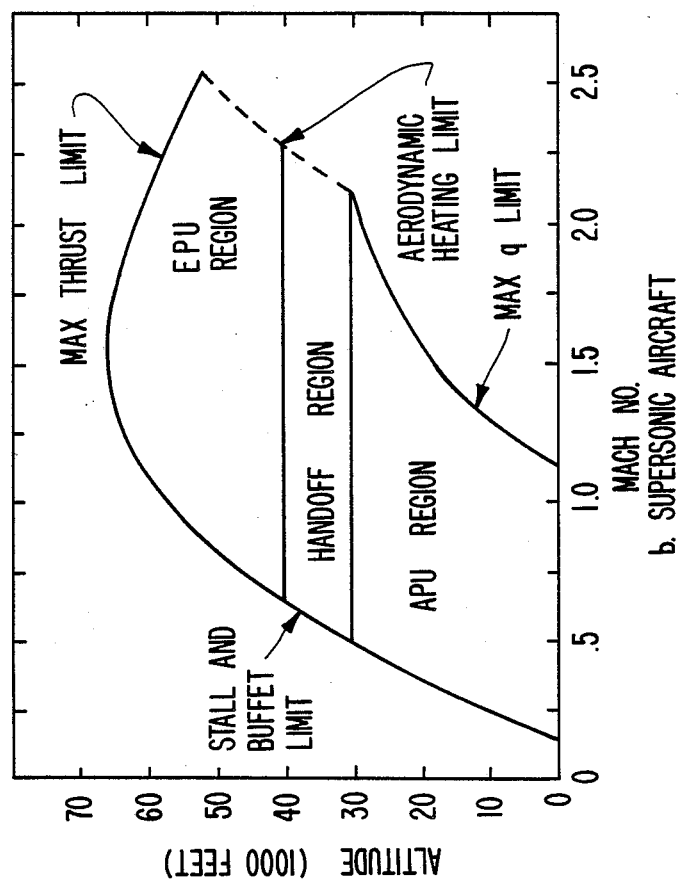
FIG. 1 illustrates the performance characteristic as a function of altitude and velocity of EPUs and APUs in the prior art.
Figure 2:
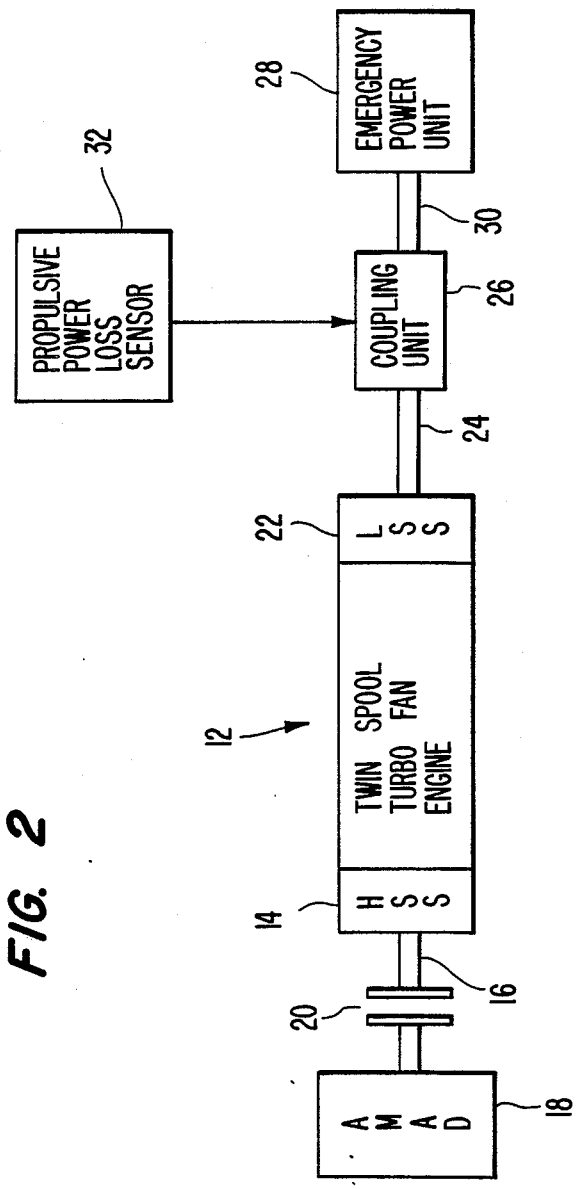
FIG. 2 illustrates a block diagram of the present invention.
Figure 3:
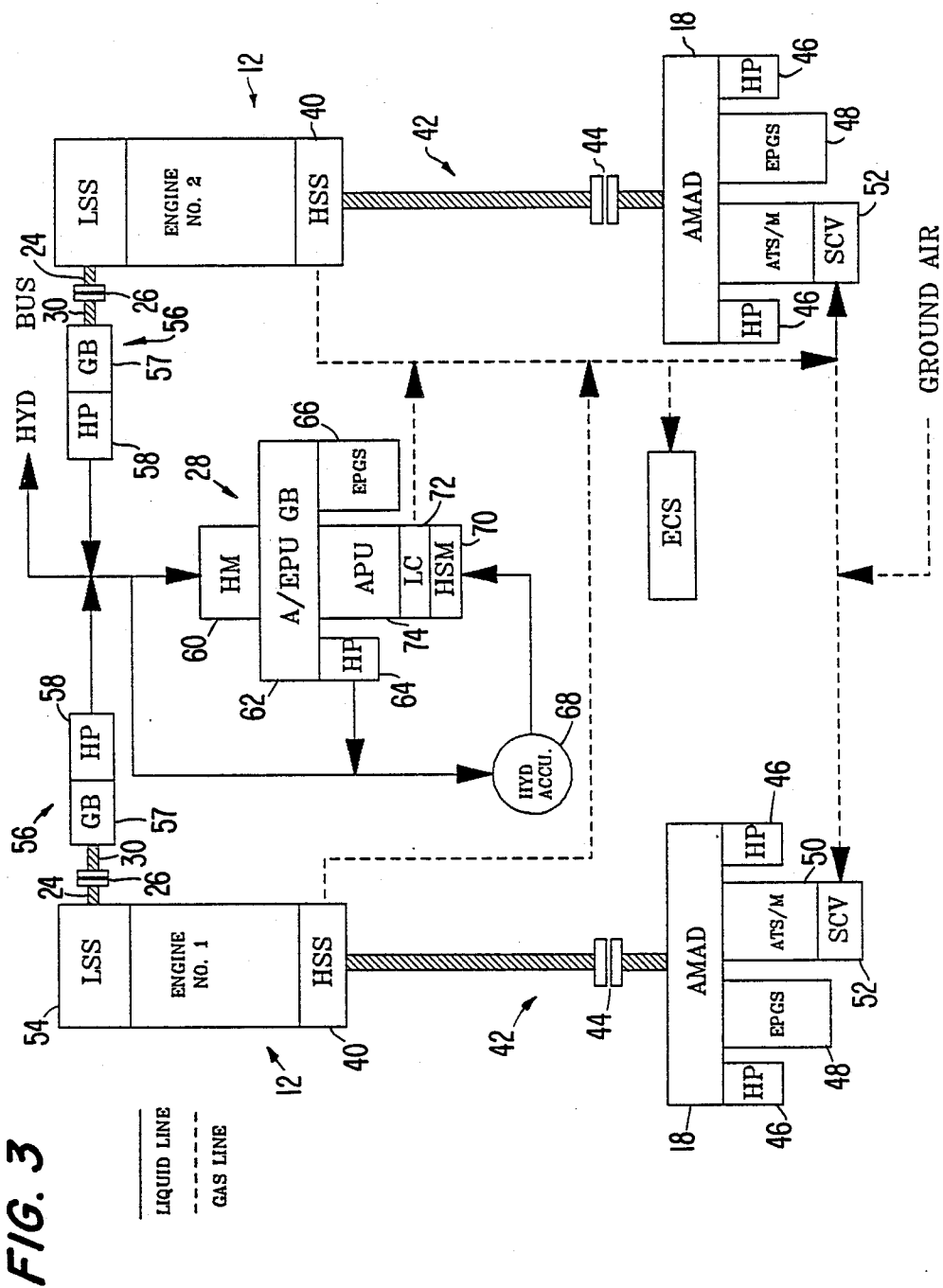
FIG. 3 illustrates a block diagram of a first embodiment of the present invention.

FIG. 2 illustrates a block diagram of the present invention. In accordance with present invention, emergency on board power is provided by a power takeoff from the low speed spool of one or more twin spool turbine engines of a jet aircraft for maintaining control of the aircraft at altitudes above which the APU is not capable of providing sufficient electrical and hydraulic on board emergency power to maintain control of the aircraft. Furthermore, the EPU of the present invention may be used to provide power to generate hydraulic or electrical power if the airframe mounted accessory drive (AMAD) is malfunctioning. It should be understood that FIG. 2 illustrates a single twin spool gas turbine engine but that the present invention is usable with one or more twin spool gas turbine engines in a jet aircraft as illustrated in the five embodiments described below with reference to FIGS. 3–7. The twin spool gas turbine 12 as a high speed spool 14 of conventional construction from which a power takeoff 16 supplies power to a conventional airframe mounted accessory drive 18 by means of a clutch 20. Although not illustrated, the airframe mounted accessory drive (AMAD) drives one or more hydraulic pumps and electric power generators to provide on board power to the airframe during normal operation. However, under emergency conditions, when propulsive power is lost such as a flameout, the high speed spool 14 rapidly looses its velocity which prevents the AMAD 18 from providing on board power for a time sufficient to permit the aircraft to descend under control to an altitude where the twin spool gas turbine may be restarted. As has been explained above with reference to FIG. 1, in the absence of an EPU at altitudes above 40,000 ft., the APU is also not operational which leaves the aircraft without on board power to drive uninterruptible electric and hydraulic power generators which are necessary to maintain control of the aircraft The low speed spool 22 has a power takeoff 24 for providing rotary power to a coupling unit 26 which may be like clutch 20 utilized with the power takeoff from the high speed spool 14 described above or any other unit for selectively permitting rotary power to be transferred from the power takeoff 22 to the EPU 28 by means of shaft 30 to generate on board power. As illustrated, the propulsive power loss sensor 32 selectively activates the coupling unit 26 to couple the shaft 24 to the shaft 30 to automatically (without pilot intervention) provide rotary power to the EPU. Unlike the high speed spool 14, the low speed spool 22 has higher rotational inertia and further rotates in response to descent in altitude by the aircraft by a windmilling effect with combined sufficient energy to drive an EPU to generate on board power. When used as an assist to the AMAD, a manual activator would be provided. The combination of the rotational inertia and windmilling effect supplies rotary power to the EPU 28 under an emergency condition such as flameout above 40,000 ft. which enables an electrical power generating system and/or hydraulic power unit (not illustrated) to generate sufficient electrical and/or hydraulic on board power to maintain control of the jet aircraft during descent to an altitude at which the APU is operational and the twin spool gas turbine 12 may be restarted to regain propulsive control of the aircraft and on board power for controlling the aircraft FIGS. 3–7 illustrate five embodiments of the present invention. The legends defined below are utilized in FIGS. 3–7 to identify parts of the present invention. Each of the parts identified below are conventional in airframes. The legends are as follows:

AMAD - AIRFRAME MOUNTED ACCESSORY DRIVE
APU - AUXILIARY POWER UNIT
ATS/M - AIR TURBINE STARTER/MOTOR
A/EPU - Auxiliary/Emergency Power Unit
ECS - ENVIRONMENTAL CONTROL SYSTEM
EPU - EMERGENCY POWER UNIT
GB - GEAR BOX
HP - HYDRAULIC PUMP
HM - Hydraulic Motor
LC - LOAD COMPRESSOR
PASS - PRESSURIZED AIR START SYSTEM
SCV - STARTER CONTROL VALVE
SM - START MOTOR
LSS - LOW SPEED SPOOL
HSS - HIGH SPEED SPOOL
HSM - HYDRAULIC STARTING MOTOR
ACCU. - ACCUMULATOR
EPGS - ELECTRIC POWER GENERATING SYSTEM
GEN - GENERATOR FIG. 3 illustrates a block diagram of a first embodiment of the present invention. As illustrated, a pair of twin spool gas turbine engines 12 of identical construction are utilized with the embodiment Each of the twin spool engines 12 has a high speed spool 40 which drives a power takeoff 42 including a clutch 44. The power takeoff 42 drives an AMAD 18 which powers a pair of hydraulic pumps 46 and an electrical power generating system 48 for respectively supplying on board hydraulic power and electrical power to the aircraft from the high speed spool. Furthermore, an air turbine starter motor 50 is provided for supplying rotary power to the airframe mounted accessory drive 18. A starter control valve 52 permits the selective coupling of pressurized air to the air turbine starter motor 50 for applying rotary power to the airframe mounted accessory drive to start the engines 12. The aforementioned high speed spool power takeoff including airframe mounted accessory drive is conventional.

The low speed spool 54 is connected to a power takeoff 56 including shaft 24, and coupling unit 26 for applying rotary power from the low speed spool to a gear box 57 which drives a first hydraulic pump 58. The propulsive power loss sensor has been omitted. The first hydraulic pump 58 supplies pressurized hydraulic fluid to hydraulic motor 60 which is connected to a gear box 32 of the A/EPU for applying rotary power thereto. The gear box of the EPU 62 drives a second hydraulic pump 64 and an electrical power generating system 66 producing a source of emergency on board pressurized hydraulic fluid and emergency on board electrical power. Both the hydraulic pump 64 and the electrical power generating system 66 are of conventional construction. The output of the second hydraulic pump 64 and the first hydraulic pump 58 is coupled to hydraulic accumulator 68 which supplies pressurized hydraulic fluid to a hydraulic starter motor 70 which supplies rotary power to an APU 74. An APU 74 drives the load compressor 72 and the gear box of the EPU 62. The APU 74 may be a conventional gas power turbine unit of the type which is not operational above approximately 40,000 ft. but which may supply an increasing amount of on board power as the aircraft descends from approximately 40,000 to 30,000 ft. at which point the APU has sufficient power generating capacity to supply the hydraulic and electrical on board power needs by driving the hydraulic pump 64 and electrical power generating system 66 without input power from the low speed spool 54. It should be understood that during normal operation, the coupling unit 26 decouples the low speed spool from the gear box 56. As is apparent from the above description, the low speed spool 54 provides all of the rotary power to the EPU 62 for supplying drive to the hydraulic pump 64 and the electrical power generating system 66 when the aircraft is above 40,000 ft. at which altitude the APU 74 is not operational. At altitudes less than 40,000 ft., the APU supplies an increasing amount of power as the aircraft descends for driving hydraulic pump 64 which permits the aircraft to be restarted once the aircraft has descended to an altitude permitting operation of the APU.

Figure 4:
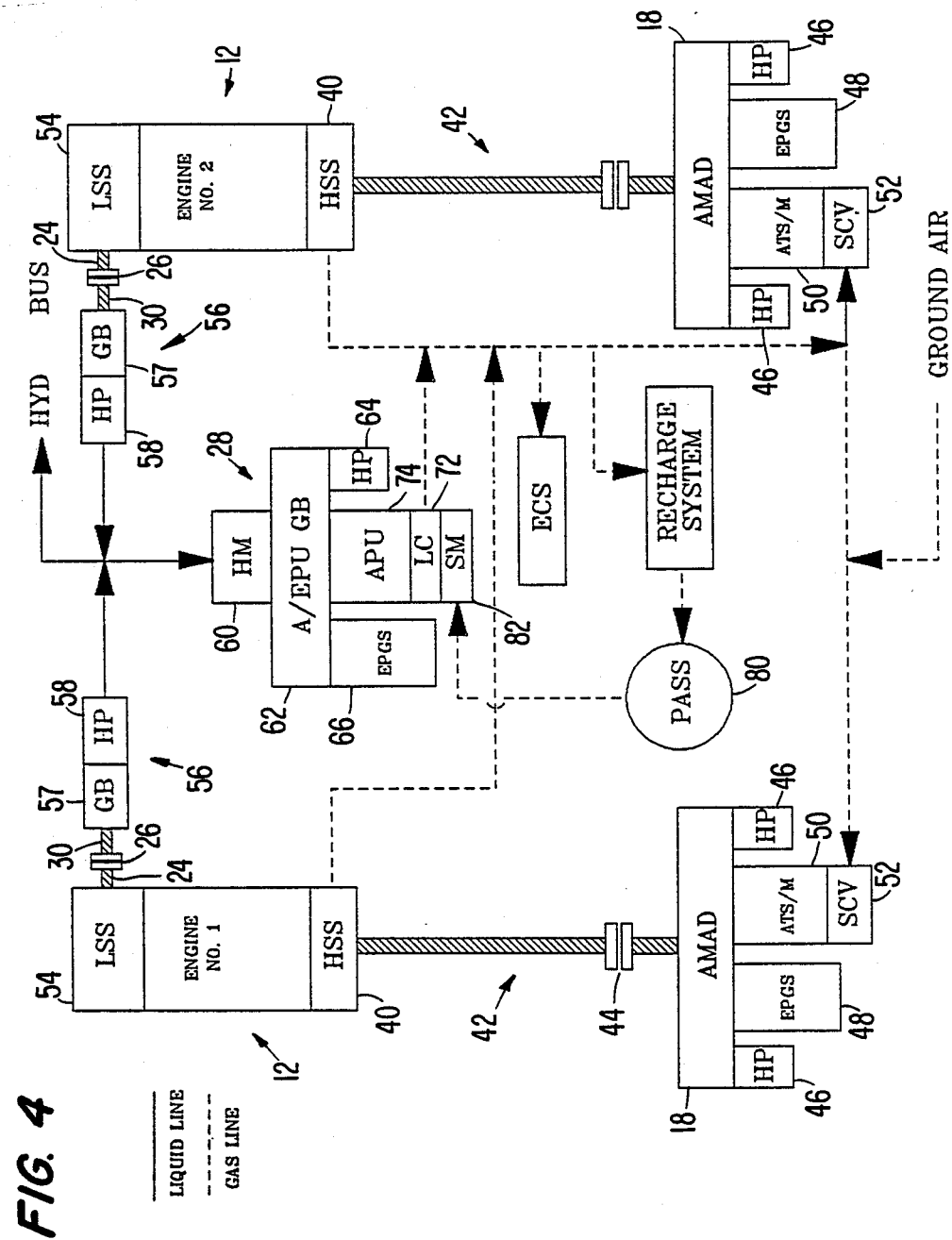
FIG. 4 illustrates a block diagram of a second embodiment of the present invention.

FIG. 4 illustrates a block diagram of a second embodiment of the present invention. Like reference numerals are identified by like parts in FIGS. 3 and 4. The second embodiment of the present invention differs in that the hydraulic accumulator 68 of the first embodiment has been eliminated and further that a pressurized air start system 80 is utilized for supplying pressurized air to starter motor 82 which supplies rotary power to the APU 74. The operation of the second embodiment is identical to the first embodiment except that the rotary power provided to the APU 74 by means of the starter motor 82 is provided by pressurized air from the pressurized air start system 80.

Figure 5:
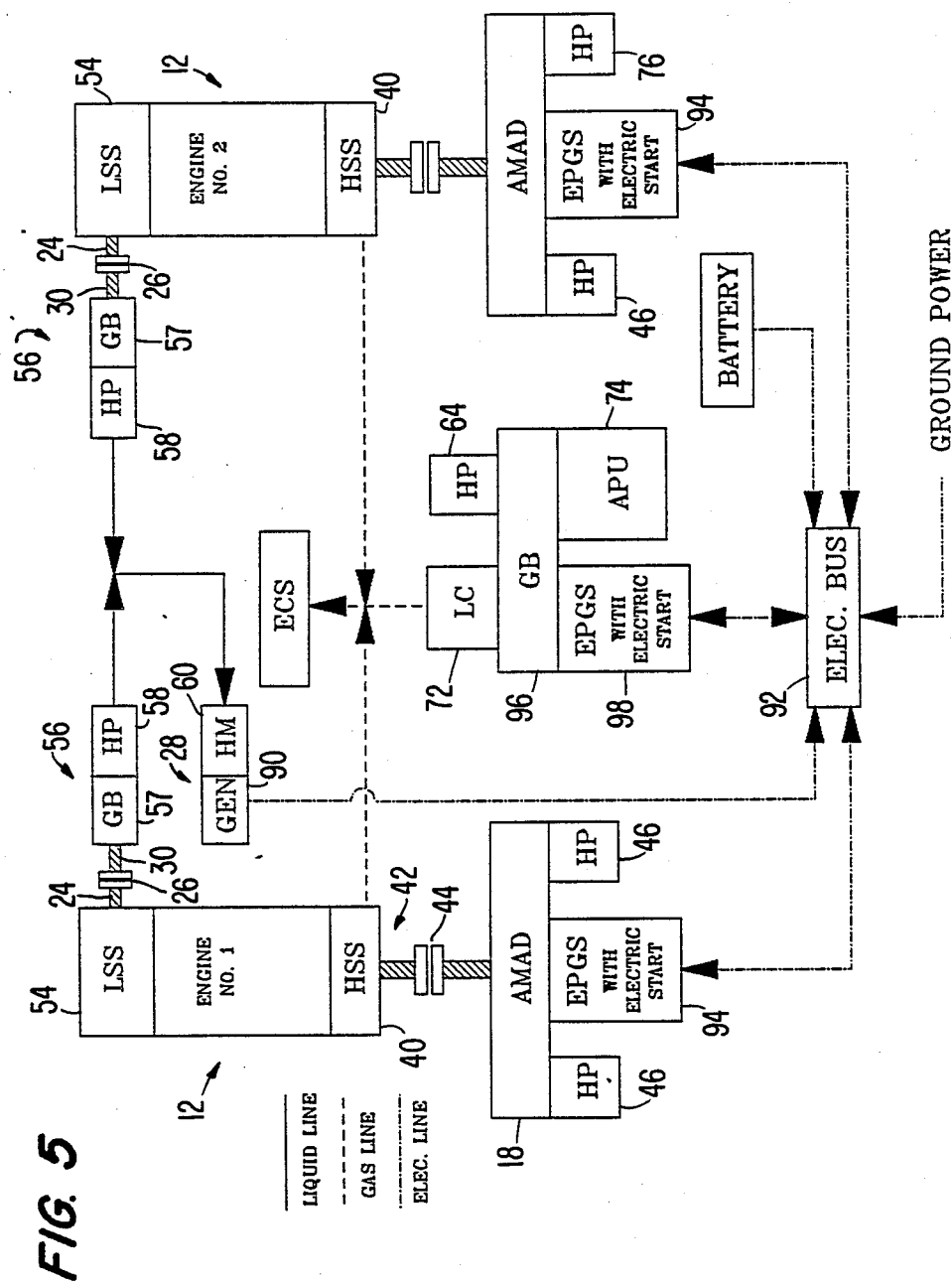
FIG. 5 illustrates a block diagram of a third embodiment of the third invention.

FIG. 5 illustrates a third embodiment of the present invention. Like reference numerals identify like parts in FIGS. 3-5 The embodiment of FIG. 5 differs from the preceding two embodiments in that emergency power is provided exclusively by the hydraulic motor 60 driving a first electrical generating system 90 of conventional construction which applies electrical on board power to electrical bus 92 during emergency conditions during which power is being extracted from the low speed spool 54. The configuration of the AMAD 18 differs somewhat in that an electrical power generating source 94 is provided with an electrical starter Output power from the electrical bus applies power to a second electrical power generating system with electrical start to apply rotary power to the AMAD 18 to permit rotary power to be applied to the high speed spool 40 for purposes of starting the gas turbine engines 12. Furthermore, the APU 74 drives a gear box 96 which drives the hydraulic pump 64, load compressor 72 and the second electrical power generating system 98 with electric starter. During emergency conditions when power is being extracted from a low speed spool 54, the hydraulic motor 60 drives the first electrical generating system 90 to produce electrical power which is applied to the electrical bus 92. If the APU 74 has ceased to operate, electrical power may be applied from the electrical bus 92 to the second electrical power generating system 98 with starter to apply rotary power to the gear box 96 to start the APU 74.

Figure 6:
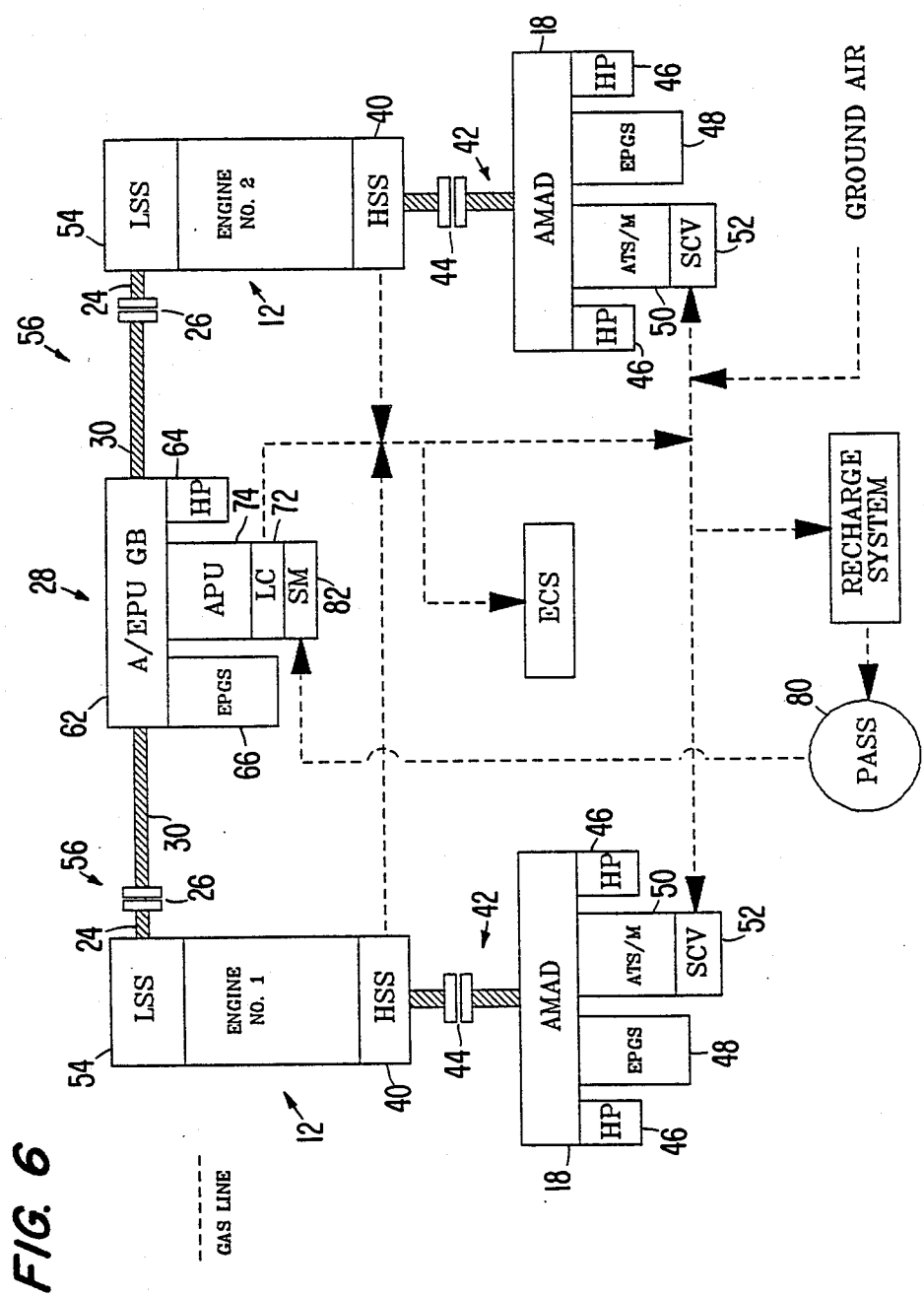
FIG. 6 illustrates a block diagram of a fourth embodiment of the present invention.

FIG. 6 illustrates a fourth embodiment of the present invention. Like parts are identified by like reference numerals in FIGS. 3-6. The embodiment of FIG. 6 is similar to the embodiment of FIG. 4 with the exception that the output from the power takeoff of the low speed spool 54 is applied directly to the gear box 62 which dispenses with the gear box 56, hydraulic pump 58 and hydraulic motor 60 of FIG. 5. This embodiment may be used to generate auxiliary power used for purposes other than on board emergency electrical or hydraulic power such as quick starting of the APU at altitudes at which the APU is operational. The rotary power from shaft 30 drives the gear box 62.

Figure 7:
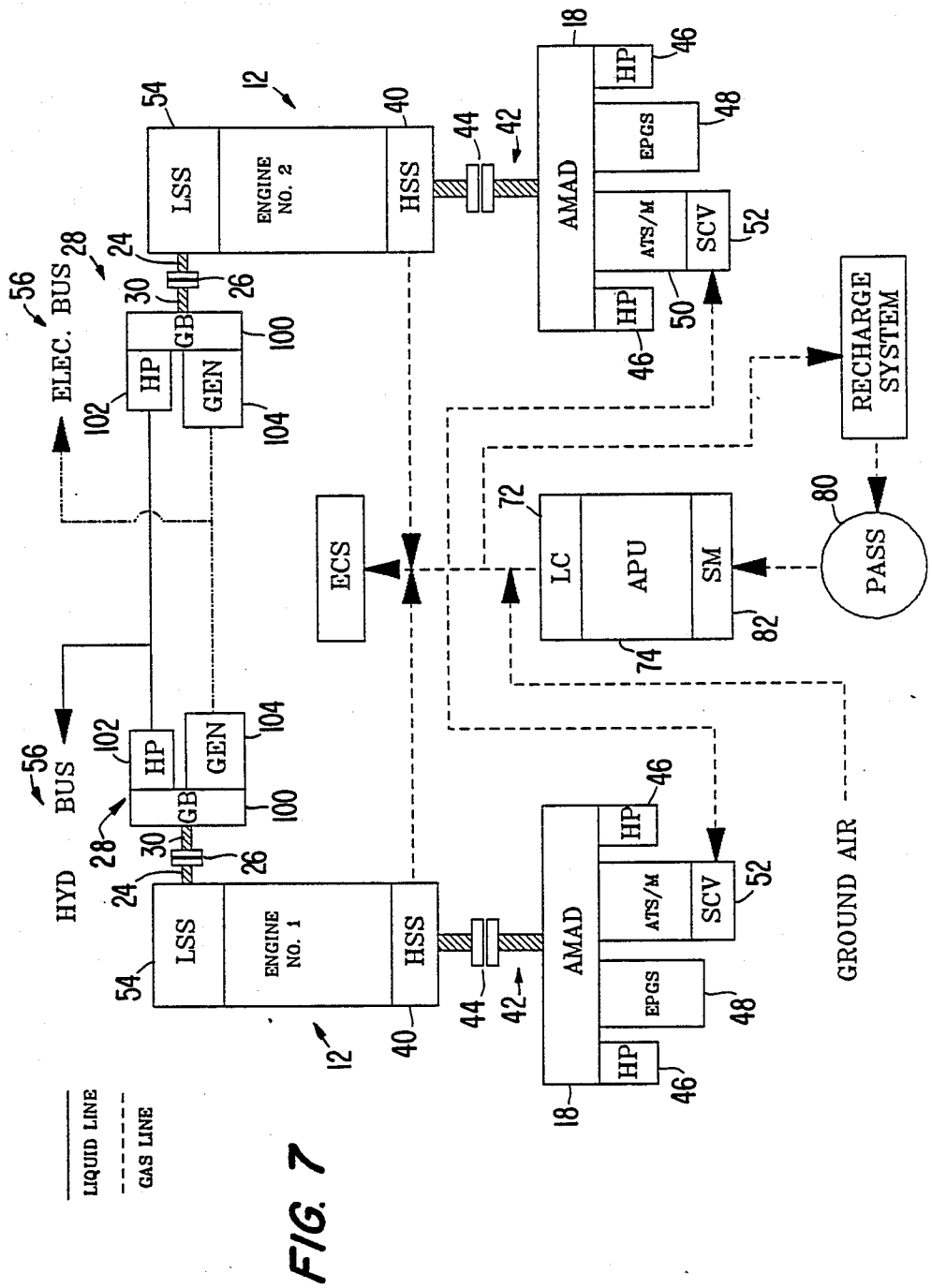
FIG. 7 illustrates a block diagram of the fifth embodiment of the present invention.

FIG. 7 illustrates a fifth embodiment of the present invention. Like reference numerals are used in FIGS. 3-7 to identify like parts. The embodiment of FIG. 7 differs from the previous embodiment in that the output from the power takeoff from the low speed spool 54 is applied to gear box 100 which drives a hydraulic pump 102 and an electrical generator 104 which respectively apply pressurized hydraulic fluid to a system hydraulic bus and electrical power to an electric bus.

While the invention has been described in terms of its preferred embodiments, it should be understood that numerous modifications may be made thereto without departing from the spirit and scope of the invention as defined in the appended claims. For example, the invention is not limited to the five specific embodiments discussed above. It is intended that all such modifications fall within the scope of the appended claims.

We claim:

1. An emergency power source for a jet aircraft having at least one gas turbine, said at least one gas turbine having a low speed spool and a high speed spool, for providing emergency on board power to the aircraft when the aircraft is at an altitude which prevents sufficient auxiliary power from being generated by an auxiliary power unit to supply an emergency on board power requirement of the aircraft comprising:
   (a) a power takeoff coupled to the low speed spool for outputting rotary power from the low speed spool;
   (b) an emergency power generating means for generating power when the emergency power generating means is driven by rotary power from the power takeoff; and
   (c) a coupling means for selectively coupling the auxiliary power unit and the emergency power generating means for joint or independent drive of an emergency power supply means.

2. An emergency power source in accordance with claim 1, further comprising:
   control means for sensing a loss of propulsive power from the at least one gas turbine and causing the coupling means to couple the power takeoff to the emergency power generating means in response to the sensing of the loss of propulsive power.

3. An emergency power source in accordance with claim 1, wherein:
   the emergency power generating means delivers electrical and hydraulic on board power to the aircraft.

4. An emergency power source in accordance with claim 2, wherein:
   the emergency power generating means delivers electrical and hydraulic power to the aircraft.

5. An emergency power source in accordance with claim 1, wherein the emergency power generating means comprises:
   (a) a gear box coupled to the coupling means;
   (b) a first hydraulic pump driven by the gear box for producing pressurized hydraulic fluid;
   (c) a hydraulic motor, coupled to the hydraulic pump for producing rotary power; and
   (d) an emergency power generating unit driven by the hydraulic motor.

6. An emergency power source in accordance with claim 1, wherein the emergency power generating means comprises:
   (a) a gear box coupled to the coupling means;
   (b) a hydraulic pump driven by the gear box for producing pressurized hydraulic fluid;
   (c) a hydraulic motor, coupled to the hydraulic pump, for producing rotary power; and (d) a first electric power generating means, coupled to the hydraulic motor, for producing electrical power in response to rotary power from the hydraulic motor.

7. An emergency power source in accordance with claim 6 further comprising:
(a) a gear box, coupled to the auxiliary power unit for providing rotary power in response to rotary power from the auxiliary power unit;
(b) a load compressor, coupled to the gear box, for producing pressurized air in response to rotary power from the gear box;
(c) a hydraulic pump, coupled to the gear box, for producing pressurized hydraulic fluid in response to rotary power from the gear box; and
(d) a second electrical power generating means having an electrical starter, coupled to the gear box and to the first electrical power generating means, for producing electrical power in response to the rotary power from the gear box and for applying rotary power from the electrical starter to the gear box in response to electrical power from the first electrical power generating means.

8. An emergency power source in accordance with claim 1, wherein the emergency power generating means comprises:
(a) a gear box coupled to the coupling means for providing rotary power in response to rotary power from the coupling means;
(b) a hydraulic pump driven by the gear box for producing pressurized hydraulic fluid; and
(c) an electrical power generating means, coupled to the gear box, for producing electrical power in response to rotary motion from the gear box.

9. An emergency power source in accordance with claim 8, further comprising:
(a) a pressurized air start system coupled to a source of pressurized air;
(b) a start motor, coupled to the pressurized air start system, for providing rotary power in response to pressurized air from the pressurized air start system; and
(c) a load compressor, driven by the auxiliary power unit, for providing pressurized air in response to rotary power applied from either or both the start motor and the auxiliary power unit.

10. An emergency power source in accordance with claim 1, wherein the emergency power generating means comprises:
(a) a gear box, coupled to the coupling means, for providing rotary power in response to rotary power from the coupling means;
(b) a hydraulic pump, coupled to the gear box, for providing pressurized hydraulic fluid in response to rotary power from the gear box; and
(c) an electrical power generating means, coupled to the gear box, for providing electrical power in response to rotary power from the gear box.

11. An emergency power source in accordance with claim 10, wherein:
the auxiliary power unit is coupled to a load compressor which provides pressurized gas to the aircraft.

12. An emergency power source for a jet aircraft having at least one gas turbine, said at least one gas turbine having a low speed spool and a high speed spool, for providing emergency on board power to the aircraft when the aircraft is at an altitude which prevents sufficient auxiliary power from being generated by an auxiliary power unit to supply an emergency on board power requirement of the aircraft comprising:
a power takeoff coupled to the low speed spool for outputting rotary power from the low speed spool;
an emergency power generating means for generating power when the emergency power generating means is driven by rotary power from the power takeoff; and
a coupling means for selectively coupling the power takeoff to the emergency power generating means; and
wherein the auxiliary power unit and the emergency power generating means both are coupled to at least one power generator which supplies on board power to the aircraft when the at least one power generator is being driven by either or both of the auxiliary power unit and the emergency power generating means.

13. An emergency power source in accordance with claim 12, wherein:
(a) the auxiliary power unit comprises a gas turbine which does not deliver any power when the aircraft is at or above a maximum altitude at which power may be generated by the auxiliary power unit; and
(b) the coupling means couples the power takeoff to the emergency power unit continuously from a time of loss of propulsive power when the aircraft is above the maximum altitude to a time when the aircraft drops below the maximum altitude to an altitude at which the auxiliary power generating means is operational to deliver power to the aircraft.

14. An emergency power source in accordance with claim 12, wherein:
the emergency power generating means delivers electrical and hydraulic on board power to the aircraft.

15. An emergency power source in accordance with claim 13, wherein:
the emergency power generating means delivers electrical and hydraulic on board power to the aircraft.

16. An emergency power source for a jet aircraft having at least one gas turbine, said at least one gas turbine having a low speed spool and a high speed spool, for providing emergency on board power to the aircraft when the aircraft is at an altitude which prevents sufficient auxiliary power from being generated by an auxiliary power unit to supply an emergency on board power requirement of the aircraft comprising:
a power takeoff coupled to the low speed spool for outputting power from the low speed spool;
an emergency power generating means for generating power when the emergency power generating means is driven by rotary power from the power takeoff; and
a coupling means for selectively coupling the power takeoff to the emergency power generating means; and
wherein said emergency power generating means comprises a gear box coupled to the coupling means, a first hydraulic pump driven by the gear box for producing pressurized hydraulic fluid, a hydraulic motor, coupled to the hydraulic pump for producing rotary power, and an emergency power generating unit including a second hydraulic pump for producing pressurized hydraulic fluid, and an electrical power generating means for generating electrical power.

17. An emergency power source in accordance with claim 16 further comprising:
  (a) a hydraulic accumulator, coupled to the first and second hydraulic pumps, for accumulating pressurized hydraulic fluid;
  (b) a hydraulically powered starting motor, coupled to the hydraulic accumulator, for providing rotary output power; and
  (c) a load compressor driven by the auxiliary power unit for producing pressurized air.

18. An emergency power source in accordance with claim 17, wherein:
  the emergency power unit and the auxiliary power unit are each coupled to the electrical power generating system and the second hydraulic pump for independently applying driving power thereto.

19. An emergency power source in accordance with claim 10 further comprising:
  (a) a pressurized air start system coupled to a source of pressurized air;
  (b) a start motor, coupled to the pressurized air start system, for providing rotary power in response to pressurized air from the pressurized air start system; and
  (c) a load compressor, driven by the auxiliary power unit, for providing pressurized air in response to rotary power applied from either or both the start motor and the auxiliary power unit.

20. An emergency power source in accordance with claim 19, wherein:
  (a) the emergency power unit and the auxiliary power unit are each coupled to the electrical power generating system and the second hydraulic pump for independently applying driving power thereto; and
  (b) the load compressor is coupled to the APU.

21. An emergency power source for a jet aircraft having at least one gas turbine, said at least one gas turbine having a high speed spool and a low speed spool for providing emergency power to aircraft on board power generating units for the aircraft at an altitude above which an air aspirated auxiliary power unit is inoperative to supply power to the power generating units comprising:
  (a) a power takeoff coupled to the low speed spool for outputting power from the low speed spool;
  (b) an emergency power generating means for generating on board power when the emergency power generating means is driven by power from the power takeoff; and
  (c) a coupling means for selectively coupling the power takeoff to the emergency power generating means and an auxiliary power unit for enabling joint or independent drive of an emergency power supply means of the aircraft.

22. An emergency power source in accordance with claim 21, wherein the power generating units comprises:
  (a) a hydraulic pump for supplying pressurized hydraulic fluid to the aircraft; and
  (b) an electrical power generating means for supplying electrical power to the aircraft.

23. A method of providing emergency on board power to a jet aircraft having at least one gas turbine, said at least one gas turbine having a high speed spool and a low speed spool at an altitude above which an air aspirated auxiliary power unit is not operative to provide power to on board aircraft power generating units comprising: p1 (a) sensing a condition requiring the generation of emergency on board power when the jet aircraft is above the altitude; and
  (b) activating a power takeoff from the low speed spool to apply power from the low speed spool to the power generating units to generate the emergency on board power by selectively coupling the power takeoff to an auxiliary power unit and an emergency power generating means for joint or independent drive of an emergency power supply means for the aircraft.

24. A method of providing emergency power in accordance with claim 23, wherein:
  the power takeoff outputs power generated from rotational inertia of the low speed spool and from air blowing through the low speed spool as a consequence of the aircraft descending in altitude.

25. An auxiliary power source for a jet aircraft having at least one gas turbine, each gas turbine having a high speed spool and a low speed spool, for providing auxiliary power to the aircraft when an airframe mounted accessory drive can not supply all of a requirement for hydraulic and electrical power comprising:
  (a) a power takeoff coupled to the low speed spool for outputting rotary power from the low speed spool;
  (b) a power generating means for generating power when the power generating means is driven by rotary power from the power takeoff; and
  (c) a coupling means for selectively coupling the power takeoff to the auxiliary power unit and emergency power unit when the air frame accessory drive is not supplying all of the requirement for hydraulic and electrical power for the aircraft for independently or jointly driving an emergency power supply means of the aircraft.

* * * * *